United States Patent
Ziech (10) Patent No.: US 8,043,188 B2
(45) Date of Patent: Oct. 25, 2011

(54) SPIDER-LESS VEHICLE DIFFERENTIAL

(75) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 474 days.

(21) Appl. No.: 12/231,605

(22) Filed: Sep. 4, 2008

(65) Prior Publication Data
US 2010/0056320 A1   Mar. 4, 2010

(51) Int. Cl.
*F16H 48/06* (2006.01)
(52) U.S. Cl. ...................... 475/230; 74/606 R
(58) Field of Classification Search .................. None
See application file for complete search history.

(56) References Cited

U.S. PATENT DOCUMENTS

| | | | |
|---|---|---|---|
| 775,233 A | 11/1904 | Cannon | |
| 1,057,466 A | 4/1913 | Taylor | |
| 1,471,915 A | 10/1923 | Page | |
| 3,964,346 A | 6/1976 | Myers, Sr. | |
| 4,084,450 A | 4/1978 | Conroy | |
| 4,125,026 A | 11/1978 | Torii | |
| 4,183,263 A * | 1/1980 | Osenbaugh | 74/606 R |
| 4,379,413 A | 4/1983 | Brammer | |
| 4,688,962 A * | 8/1987 | Koltookian | 403/408.1 |
| 4,733,578 A | 3/1988 | Glaze et al. | |
| 4,959,043 A | 9/1990 | Klotz et al. | |
| 5,507,702 A | 4/1996 | Joachim et al. | |
| 5,545,102 A | 8/1996 | Burgman et al. | |
| 5,647,814 A | 7/1997 | Krisher | |
| 5,718,653 A | 2/1998 | Showalter | |
| 5,941,790 A | 8/1999 | Steen | |
| 5,980,416 A | 11/1999 | Gafvert | |
| 6,623,396 B2 | 9/2003 | Szalony et al. | |
| 6,645,113 B2 | 11/2003 | Orr et al. | |
| 6,652,408 B2 | 11/2003 | Rutt | |
| 6,659,651 B1 * | 12/2003 | Turner et al. | 384/585 |
| 6,689,009 B1 * | 2/2004 | Fett | 475/230 |
| 6,695,739 B2 | 2/2004 | Fett | |
| 6,699,154 B2 | 3/2004 | Orr | |
| 6,702,707 B2 | 3/2004 | Krzesicki | |
| 6,705,965 B2 | 3/2004 | Sullivan | |
| 6,719,661 B2 | 4/2004 | Turner | |
| 6,743,138 B2 | 6/2004 | Krzesicki et al. | |
| 6,840,883 B2 | 1/2005 | Orr | |
| 6,981,929 B2 | 1/2006 | Janiszewski | |
| 7,261,664 B2 | 8/2007 | Szuba | |
| 7,306,537 B2 | 12/2007 | Nakajima | |
| 2003/0144106 A1 | 7/2003 | Szalony | |
| 2003/0144107 A1 * | 7/2003 | Orr et al. | 475/230 |
| 2005/0101430 A1 | 5/2005 | Ziech | |
| 2005/0245342 A1 | 11/2005 | Pontanari | |
| 2006/0063634 A1 | 3/2006 | Szuba | |
| 2006/0287155 A1 | 12/2006 | Nakajima | |
| 2006/0287156 A1 | 12/2006 | Nakajima | |
| 2007/0032334 A1 | 2/2007 | Green, Jr. | |

(Continued)

FOREIGN PATENT DOCUMENTS
DE    3926878 A1    3/1990
(Continued)

*Primary Examiner* — Justin Holmes
(74) *Attorney, Agent, or Firm* — Marshall & Melhorn LLC (57) ABSTRACT

A ring gear has a plurality of spaced apart recess on an internal surface for receiving a plurality of side pinions within the recesses. The side pinions are driven directly by the ring gear without a differential spider or differential pin.

29 Claims, 7 Drawing Sheets

U.S. PATENT DOCUMENTS

2010/0151983 A1 * 6/2010 Ziech et al. .................. 475/230

FOREIGN PATENT DOCUMENTS

| | | | |
|---|---|---|---|
| EP | 1734287 | A1 | 12/2006 |
| EP | 1734288 | A2 | 12/2006 |
| EP | 1767817 | A1 | 3/2007 |
| EP | 1895197 | A2 | 3/2008 |
| JP | 4-132245 | | 12/1992 |
| JP | 11 082680 | | 3/1999 |

* cited by examiner

SPIDER-LESS VEHICLE DIFFERENTIAL

FIELD OF THE INVENTION

The present invention relates to a vehicle differential and more particularly to a vehicle differential without a spider shaft or differential pin.

BACKGROUND OF THE INVENTION

Most vehicle differentials have a torque path from the ring gear to the differential case to the spider shaft to the bevel gear differential side pinions. Every time torque is transferred from one of these structures to another, a robust joint is required, materials of high strength must be used and the adjacent structures must be machined to close tolerances to function properly.

Typical wheel differential side pinions are driven by a spider shaft, or differential pin, that requires a through bore in each side pinion. The bore creates a thin section of material at the side pinion toe end that is a potential failure mode and which limits the maximum spider shaft diameter. Further, the spider shafts are separate pieces that can be expensive to manufacture.

Sometimes the prior art differential cases are constructed out of a relatively soft material. In these cases, differential pinion thrust washers must be located between the differential case and the side pinions to prevent excessive wear and potential failure of the case or the pinions or both.

In view of the shortcomings of the prior art differentials, it would be advantageous for a differential to have as direct as possible torque path from the ring gear to the wheel differential side pinions to reduce joint and structure loads that require expensive materials or methods of manufacture. It would also be advantageous to avoid thinning the wheel differential side pinions to reduce or prevent potential failures in this area. It would also be advantageous to eliminate the need for a spider pin to reduce materials and production costs. It would also be advantageous to eliminate the need for differential pinion thrust washers.

SUMMARY OF THE INVENTION

The present invention is directed toward a differential without a spider shaft or differential pin. A ring gear is provided with an internal surface having a plurality of side pinion recesses. Side pinions are located in the recesses and are directly driven by the ring gear.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
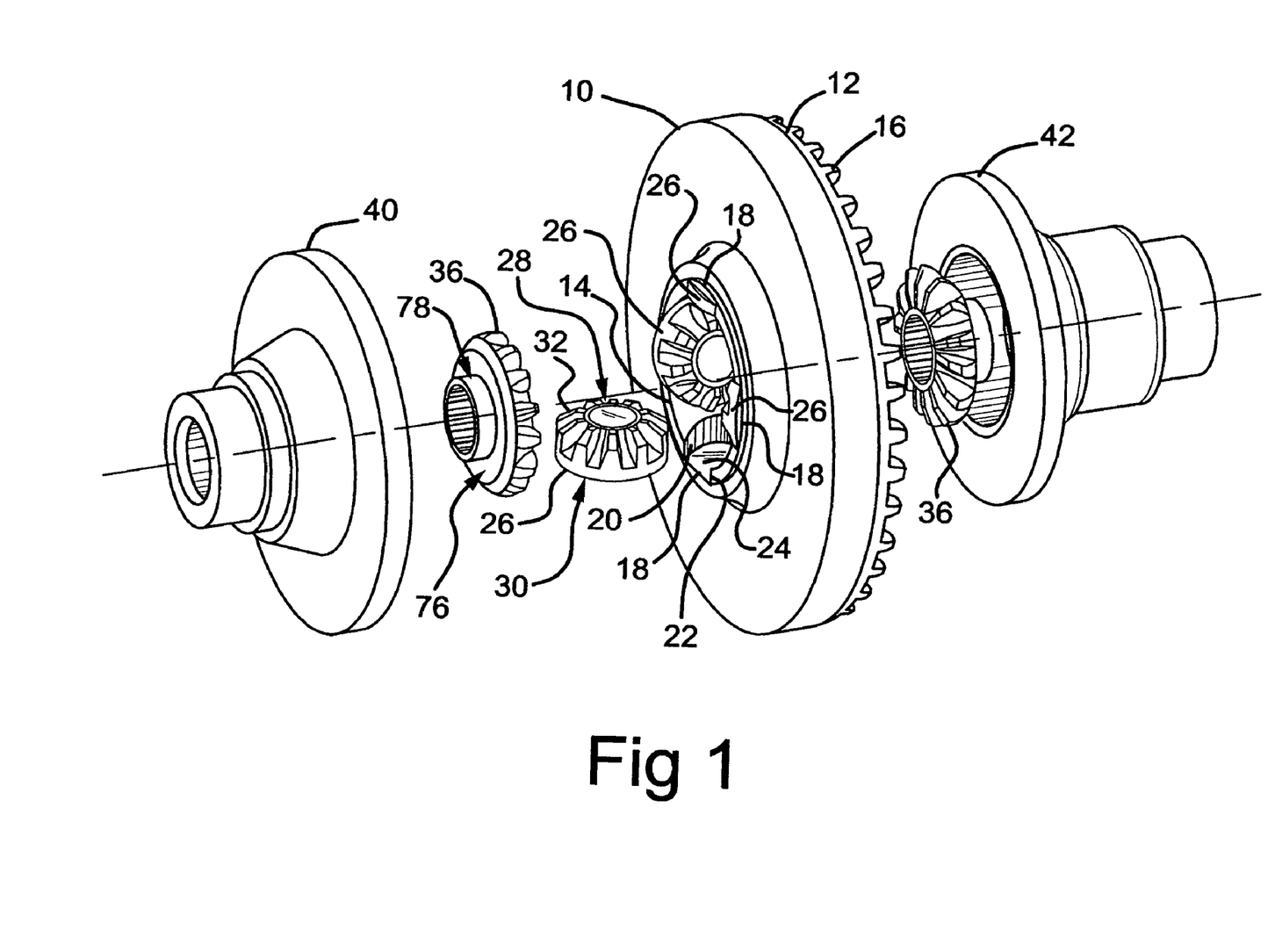
FIG. 1 is an exploded, schematic perspective view of certain components of the present invention.

Turning now to FIG. 1, one embodiment of a one-piece, internally formed unitary ring gear 10 is schematically depicted. The ring gear 10 has an external surface 12 and an internal surface 14, which together form a toroidal-like shape. The external surface 12 comprises a plurality of teeth 16, which are designed to engage with a pinion gear. While the plurality of teeth 16 are depicted on one side of the ring gear 10, it can be appreciated that the teeth 16 can be instead located on the other side of the ring gear 10.

The internal surface 14 of the ring gear 10 has a plurality of spaced apart recesses 18. In the depicted embodiment, four recesses 18 are shown, however, a greater or lesser number is within the scope of the invention. It is preferred that each of the recesses 18 is defined by at least a first and a second side wall 20, 22 but the recesses 18 may also be entirely bounded by the internal surface 14.

Each recess 18 is also defined by a side pinion seat surface 24. Preferably, the side pinion seat surface 24 is substantially planar. Thus, it can be appreciated that the height of the side walls may vary around the recesses 18.

As shown in FIG. 1, the first and second side walls 20, 22 extend substantially perpendicularly from the side pinion seat surface 24; other orientations of the side walls 20, 22 are permissible and are discussed below.

Preferably, one side pinion 26 is located in each of recess 18. Each side pinion 26 has a toe end 28 and a heel end 30. The heel end 30 of the side pinion 26 is located against the side pinion seat surface 24. The side pinions 26 each have a plurality of teeth 32 on their outer surfaces. The heel end 30 of each of the side pinions 26 has an outer peripheral edge.

Figure 2:
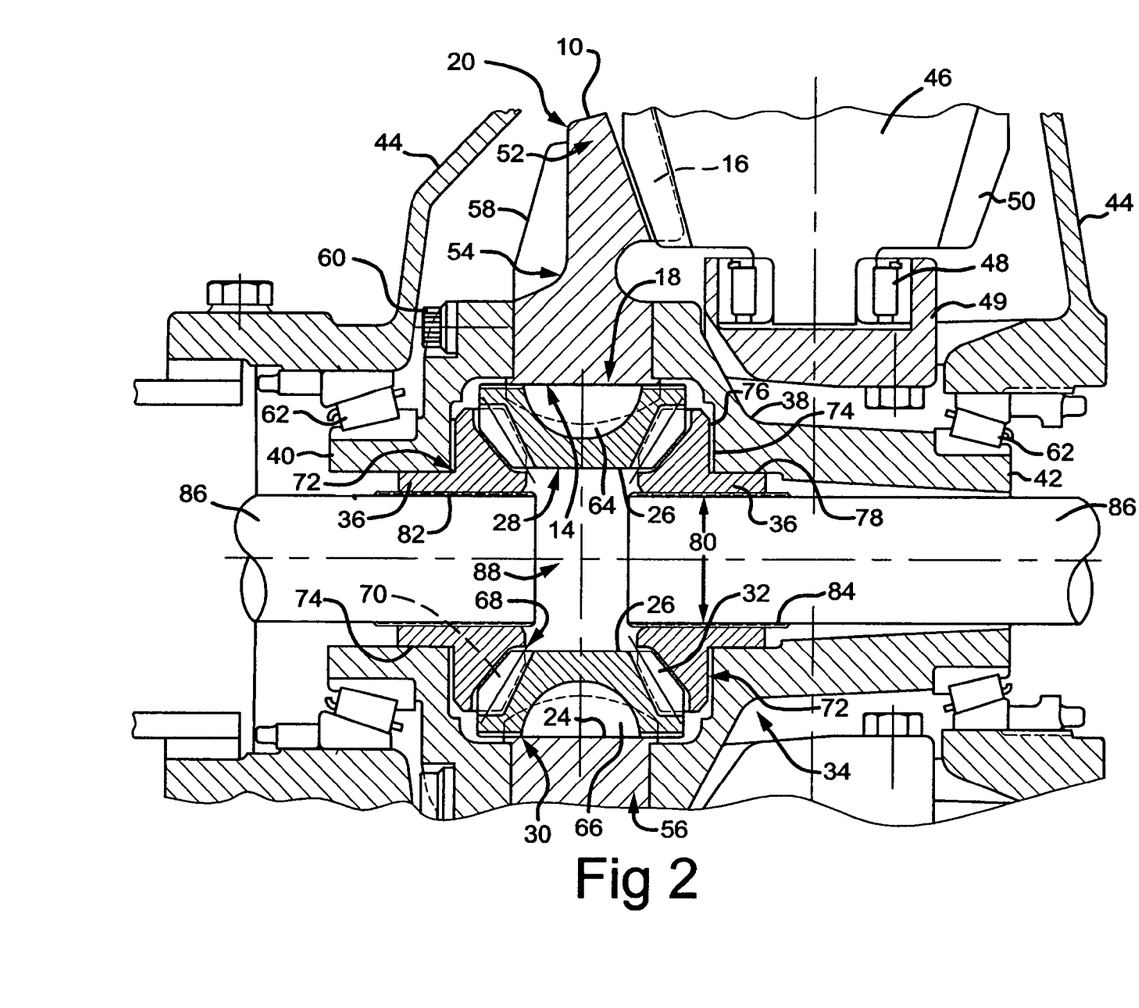
FIG. 2 is a cutaway plan view of an embodiment of the present invention.

The ring gear 10 and its associated side pinions 26 may be part of a differential assembly 34, as shown in FIG. 2. The differential 34 may comprise side gears 36 that mesh with the side pinions 26. The differential 34 may also comprise a differential case 38, in which the side gears 36 reside. The differential case 38 may be comprised of a first half 40 and a second half 42. The ring gear 10 is located between the first and second halves 40, 42 of the case 38.

FIG. 2 also depicts the components discussed above within a differential housing 44 along with other components. A pinion gear 46 is provided within the differential housing 44. The pinion gear 46 is rotatably driven, such as by an internal combustion engine (not shown). The pinion gear 46 is rotatably mounted within the differential housing 44 on at least one bearing 48 on a pinion bearing cage 49.

The pinion gear 46 has a plurality of teeth 50. The pinion gear teeth 50 are meshed with the plurality of teeth 16 on the ring gear 10 within the differential housing 44. Thus, rotational movement is translated from the pinion gear 46 to the ring gear 10.

The ring gear 10 has an upper tooth portion 52, an intermediate waist portion 54 and a base portion 56. The plurality of teeth 16 are located on the upper tooth portion 52. Directly below the upper tooth portion 52 is the intermediate waist portion 54. In the depicted embodiment, the waist portion 54 has a thickness that is less than a thickness of the upper tooth portion 52 or the base portion 56. Ribs 58 may extend from the base portion 56, along the waist portion 54 to the upper tooth portion 52 to provide increased strength and rigidity to the ring gear 10. The base portion 56 of the ring gear 10 comprises the internal surface 14 and the recesses 18.

The first and second differential case halves 40, 42 are attached to the base portion 56 of the ring gear 10. The case halves 40, 42 may be attached by welding (see FIG. 3), mechanical fasteners, bonded press fit and/or cold formed. As shown in FIG. 2, the case halves 40, 42 are attached to the ring gear 10 by a bolt 60. Not all the bolts 60 are shown in the figure, but those skilled in the art readily appreciate that a plurality of bolts are needed.

The first and second differential case halves 40, 42 are rotatably supported within the differential housing 44 on their own separate bearings 62.

Figure 3:
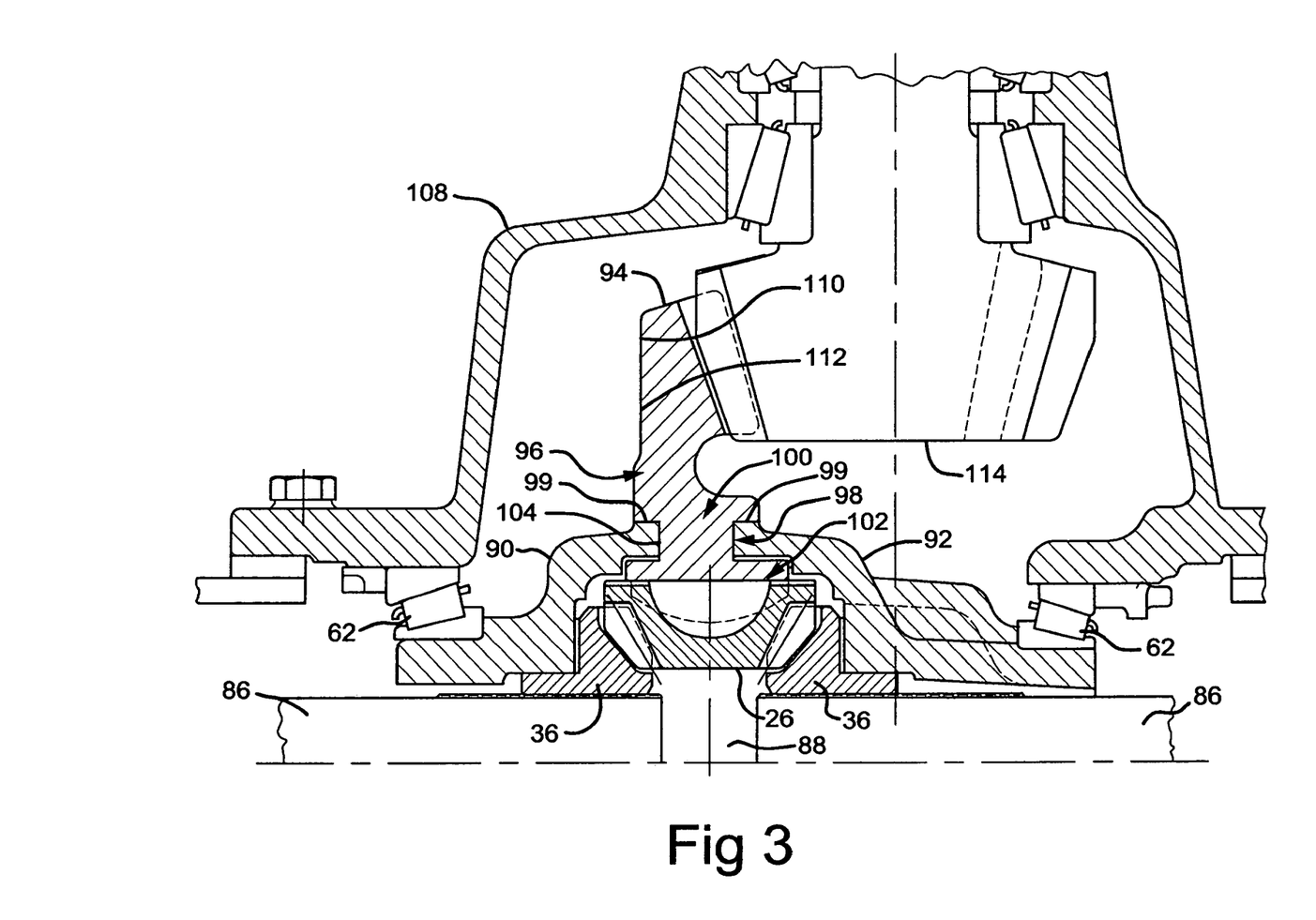
FIG. 3 is a cutaway plan view of yet another embodiment of the present invention.

The side pinions 26 are located within the recesses 18 within the ring gear 10. The heel ends 30 of the side pinions 26 are located against the side pinion seat surfaces 24 of the recesses 18. It can be appreciated that the rotational motion from the ring gear 10 is therefore transferred directly to the side pinions 26 through the side walls 20, 22. A diameter of each of the side pinions 26 is greater than a width of the ring gear 10, and thus when each of the side pinions 26 is disposed in the recesses 18, a portion of the outer peripheral edge extends past the sides of the ring gear 10. As shown in FIGS. 1-3, when the side pinions 26 are located within the recesses 18, a portion of the outer peripheral edge of the heel end 30 of each of the side pinions 26 extends outwardly from the internal surface 14 of the unitary ring gear 10.

The heel ends 30 of some, or each, of the side pinions 26 forms a lubricant cavity 64 or reservoir. The cavity 64 may be of any shape but, in the depicted in embodiment, it is bowl shaped. The widest portion of the cavity 64 is the cavity opening 66 at the heel end 30 of the side pinion 26. The cavity 64 extends down into the side pinion 26 but it does not extend through the side pinion. The cavity 64 is beneficial as it retains lubricant when the side pinion 26 reaches the uppermost position during differential rotation.

Regardless of the shape of, or even presence of, a lubricant cavity 64, it is preferred that the toe end 28 of the side pinion 26 is boreless. In other words, there is no bore, channel or other means that permits lubricant to pass directly from the cavity 64, or otherwise through, from the heel end 30 to the toe end 28 of the side pinion 26.

An outer surface 68 of each side pinion 26 comprises the plurality of teeth 32. The teeth 32 of each side pinion 26 are meshed with a plurality of teeth 70 on the side gears 36 to transmit rotational drive from the side pinions 26 to the side gears 36.

The backsides 72 of the side gears 36 have a complimentary shape to inner walls 74 of the first and second differential case halves 40, 42. In FIG. 2, the backsides 72 of the side gears 36 have an L-shape cross section that is complimentary to the inner walls 74 of the case halves 40, 42. The L-shape is comprised of a substantially vertical surface 76 extending approximately the length of the teeth 70. A substantially cylindrical surface 78 intersects with the vertical surface 76 to create the L-shape.

The inner diameters 80 of the side gears have a plurality of splines 82. The side gear splines 82 mesh with splines 84 on the outer diameter of axle half shafts 86 located within the side gears 36. Rotational force is transmitted through the side gears 36 to the axle half shafts 86 to rotate the shafts 86.

Based on the above, it can be appreciated that no spider shaft connecting the side pinions 26 to the ring gear or the differential case, or cases as the situation may be, is required. Instead, the side pinions 26 and axle half shafts 86 define a hollow gap 88 between them. Furthermore, there is a direct rotational force path from the ring gear 10 to the side pinions 26 such that the ring gear bolts 60 and differential case halves 40, 42 are not used to transmit vehicle drive rotational force.

FIG. 3 depicts an alternative embodiment of the structures depicted in FIG. 2 and described above. Reference numbers for like structures are repeated in FIG. 3 and used below.

In the embodiment of FIG. 3, first and second differential case halves 90, 92 are connected to a ring gear 94 by welding 99. No mechanical fasteners are required to secure the case halves 90, 92 to the ring gear 94 in this embodiment. The case halves 90, 92 are welded to a base portion 96 of the ring gear 94.

The base portion 96 may have a waist portion 98 with a thickness t that is less than a thickness t1 of an upper portion 100 of the base portion 96. The thickness t is also less than a thickness t2 of a lower portion 102 of the base portion 96. The different thicknesses results in a groove 104 in the ring gear 94 between the upper and lower portions 100, 102 of the base portion 96. The case halves 90, 92 may extend into the groove 104 and be secured therein by welding 99.

The lower portion 102 of the base portion 96 is in direct driving contact with the side pinions 26 as described above.

A pinion gear 114, such as pinion gear 46, is provided to drive the ring gear 94. The pinion gear 114 may or may not be supported by a bearing cage, as with cage 49 in FIG. 2.

In the embodiment depicted in FIG. 3, neither the case halves 90, 92 nor the weld 99 are required to transmit the drive rotational force.

Figure 4:
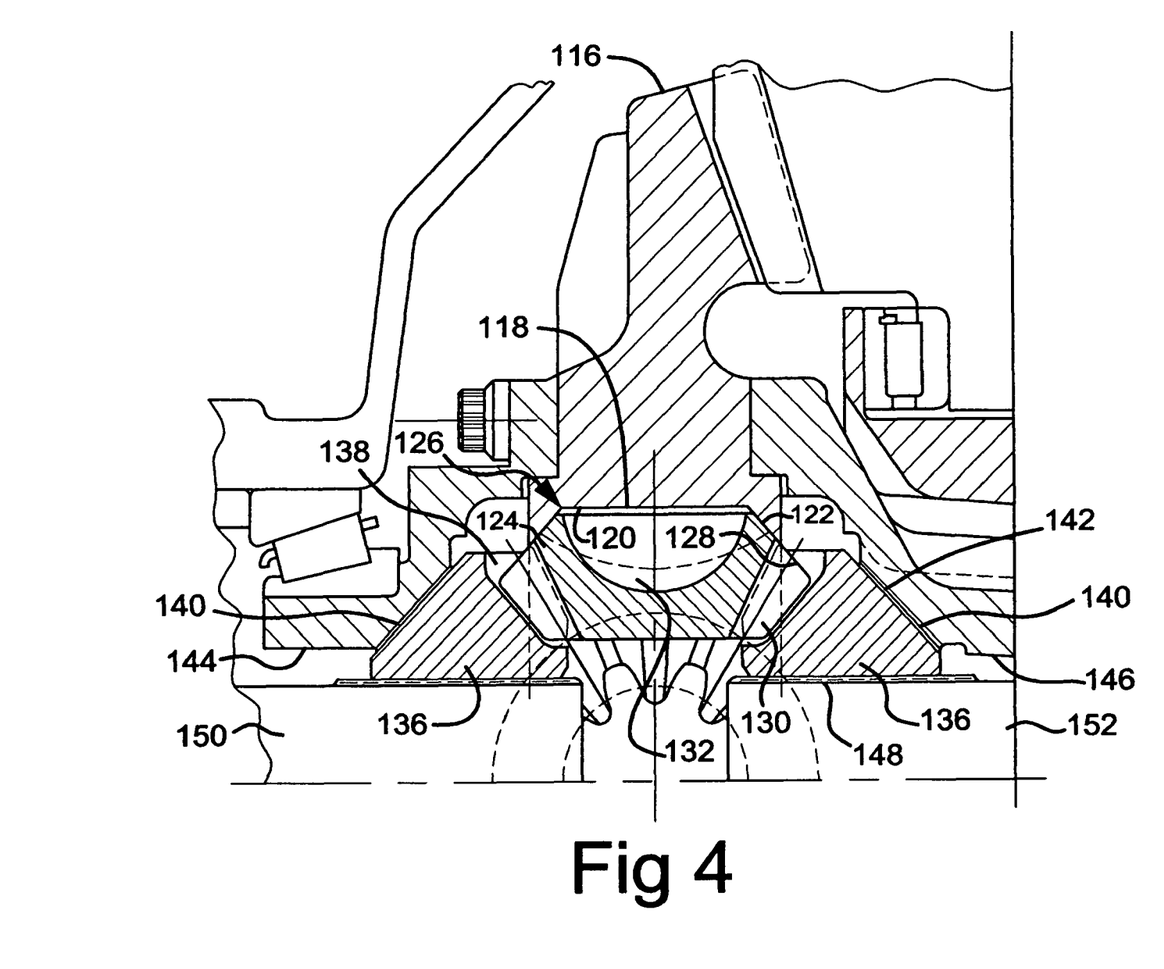
FIG. 4 is a cutaway plan view of yet another embodiment of the present invention.

FIG. 4 depicts an alternative embodiment to the structure depicted in FIG. 2 and described above. Again, reference numbers will be used for similar structures depicted in FIG. 4.

In this embodiment, a ring gear 116 has plurality of conically shaped recesses 118. The recess 118 have side pinion seat surface 120 that are still substantially planar with side walls 122 tapering downwardly toward the seat surfaces 120 to form the conically shaped recesses 118. The degree of taper depicted in FIG. 4 may be varied.

Conically shaped side pinions 124 are located within the recesses 118. Preferably, a heel end 126 of each side pinion 124 is provided with side walls 128 that taper down to the heel end 126 from a plurality of side pinion teeth 130. The angle of taper determines the amount of friction generated to resist the relative rotation of the side pinion 124 with respect to the ring gear recess 118.

A bowl-shaped oil cavity 132 is provided in the heel end 126 of each side pinion 124, as described above. The heel end 126 of each side pinion 124 is substantially entirely located within and is entirely surrounded by the wall 122 of the recess 118 of the ring gear 116.

The side pinions 124 mesh with side gears 136. It can be appreciated that since the heel ends 126 of the side pinions 124 are located within the recesses 118, that the teeth 130 portion of each side pinion 124 extends axially outward from the recesses 118 to mesh with teeth 138 on side gear 136.

The backsides 140 of the side gears 136 are tapered. Inner surfaces 142 of differential case halves 144, 146 adjacent the side gears 136 has a taper design that is complimentary to the taper of the backsides 140 of the side gears 136. The tapered nature of the side gears 136 imparts a frictional torque to resist differential spin out. The inner diameters 148 of the side gears 136 are splined to the axle half shafts 150, 152.

Figure 5:
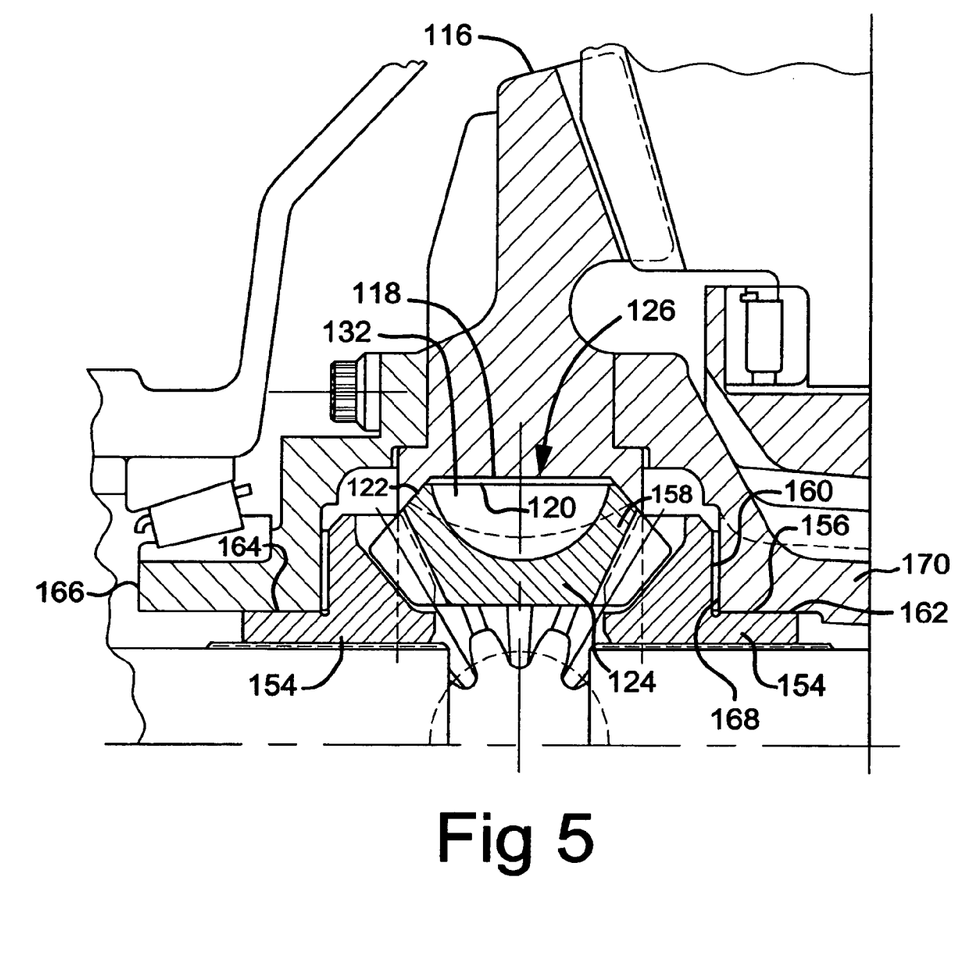
FIG. 5 is a cutaway plan view of yet another embodiment of the present invention.

FIG. 5 depicts a variation of the embodiment of FIG. 4 wherein side gears 154 with L-shaped cross section 156 are meshed with a conical side pinion 158. In this embodiment, a substantially vertical surface 160 intersects with a substantially cylindrical surface 162 to create the L-shaped cross sections 156 of each side gear 154. An inner surface 164 of a first differential case half 166 and an inner surface 168 of a second differential case half 170 have a complimentary shape to the vertical and horizontal surfaces 160, 162 of the side gears 154 such that the side gears 154 nest within the differential case halves 166, 170.

Figure 6:
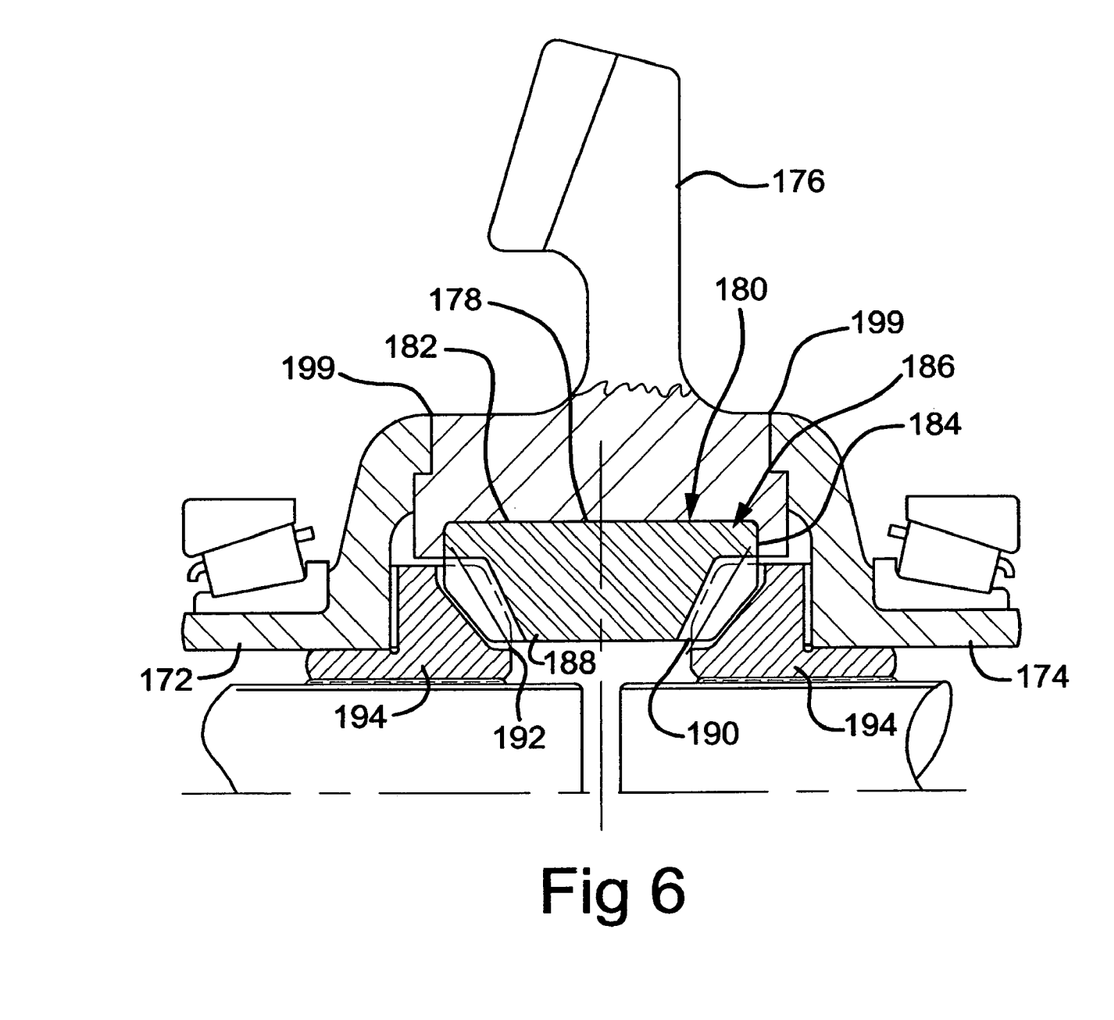
FIG. 6 is a cutaway plan view of yet another embodiment of the present invention.

Another embodiment of the present invention is depicted in FIG. 6. A first differential case half 172 and second differential case half 174 in this embodiment are secured to a ring gear 176 by welding 199, however, mechanical fasteners may be used in addition or instead of welding 199.

In FIG. 6, one recess 178 of a plurality is depicted in the ring gear 176. It can be appreciated from the foregoing that other recesses are spaced about an internal surface 180 of the ring gear 176.

The recess 178 has a side pinion seat surface 182 that is substantially planar. Side walls 184 extend substantially perpendicularly from the side pinion seat surface 182 to create the recess 178. A heel end 186 of a side pinion 188 is located entirely within and is entirely surrounded by the recess 178. The side pinion 188 has teeth 190 that extend above, or radially inward from, the recess 178 and engage with teeth 192 of adjacent side gears 194.

While a lubricant reservoir is not depicted in the side pinion 188 of FIG. 6, it can be appreciated that one may be provided.

Figure 7:
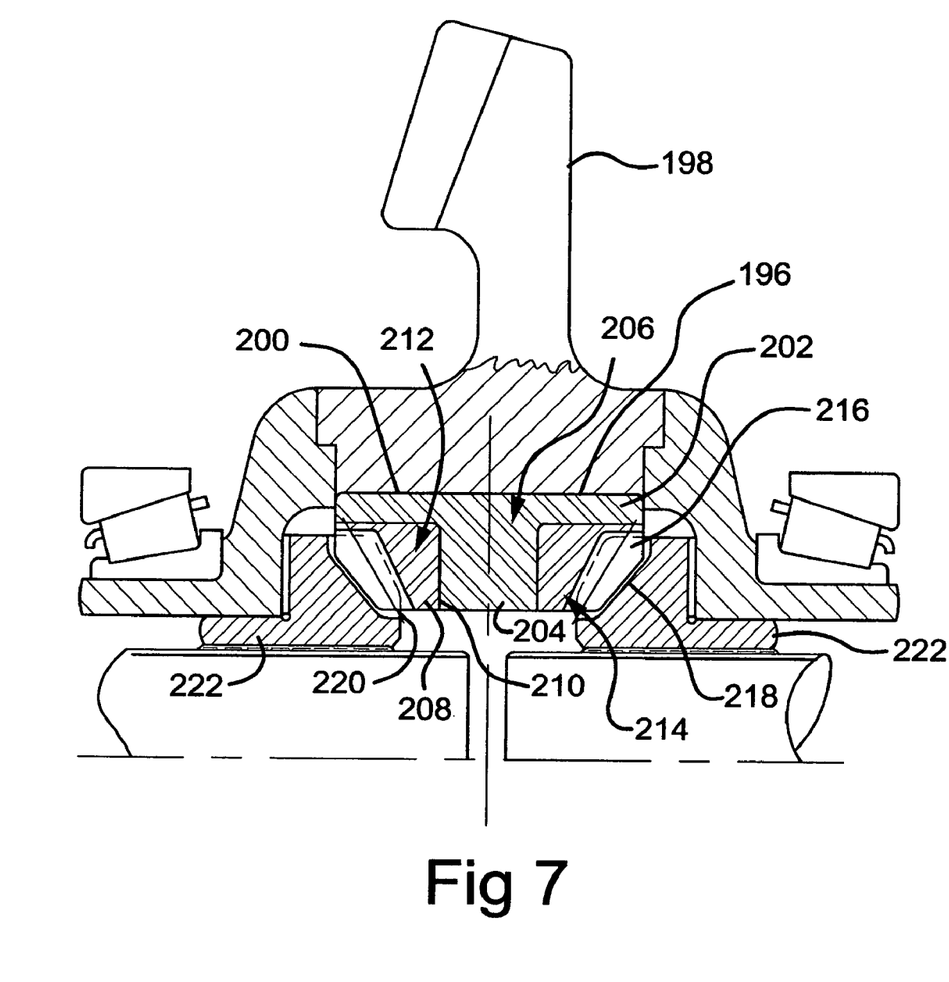
FIG. 7 is a cutaway plan view of yet another embodiment of the present invention.

FIG. 7 depicts yet another embodiment of the present invention wherein a recess 196 in a ring gear 198 is provided. The recess 196 has a planar side pinion seat surface 200 and at least two side walls, which can be appreciated from FIG. 1, extending radially inward therefrom. A base 202 for a side pinion stub 204 is located within the recess 196. The side pinion stub 204, which may be unitary and integrally formed with the base 202, extends radially inward from the base 202. The stub 204 is centered in substantially the middle portion 206 of the base 202.

A side pinion 208 is located over the stub 204. In the depicted embodiment, a central bore 210 extends entirely through the side pinion 208 from heel portion 212 to toe portion 214. It is within the scope of the present invention for the central bore to only partially extend from the heel portion 212 into the side pinion 208.

The side pinion 208 has a plurality of teeth 216 located on an outer surface 218 thereof for engagement with teeth 220 on the side gear 222.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A differential, comprising:
a unitary ring gear having an internal surface and an external surface, said internal surface having circumferentially spaced apart recesses, each of said recesses having a side pinion seat surface bounded by two opposed side walls; and
at least two side pinions each having a heel end and a toe end, wherein at least said heel end is located in one of said recesses and in direct driving contact with side walls of said recess, a portion of an outer peripheral edge of the heel end of each of the side pinions extends outwardly from the internal surface of the unitary ring gear, and said toe end is boreless.

2. The differential of claim 1, wherein said ring gear has two or more recesses in said internal surface for receiving as many side pinions.

3. The differential of claim 1, wherein said side walls of said recesses are substantially perpendicular to said side pinion seat surfaces and said heel ends of said side pinions have a complimentary shape to said recesses.

4. The differential of claim 1, wherein said side walls of said recesses conically taper down to said side pinion seat surfaces and said heel ends of said side pinions have a complimentary shape to said recesses.

5. The differential of claim 4, wherein said ring gear is bolted to a differential case, said differential case having tapered internal walls complimentary to and in direct contact with tapered exterior side gear surfaces.

6. The differential of claim 3, wherein said ring gear is bolted to a differential case, said differential case having internal walls that are complimentary to and in direct contact with exterior side gear surfaces.

7. The differential of claim 2, wherein said side pinions each have a plurality of teeth located about an outer surface thereof, said plurality of teeth extend axially outward beyond a base portion of said ring gear for engagement with a plurality of teeth on adjacent side gears.

8. The differential of claim 2, wherein each of said side pinions comprises a heel end lubricant cavity.

9. The differential of claim 7, wherein said side gears are in driving engagement with two half shafts and wherein said half shafts and toe ends of said side pinion define a gap between them.

10. The differential of claim 2, wherein said heel ends are substantially entirely located within and entirely surrounded by said recesses of said ring gear.

11. The differential of claim 1, wherein said ring gear is located between a first differential case half and a second differential case half.

12. The differential of claim 11, wherein at least one bolt is used to secure said ring gear is bolted to said first and said second differential case halves.

13. The differential of claim 2, wherein said ring gear is located substantially directly radially outward from said side pinions.

14. The differential of claim 1, wherein said ring gear has an upper tooth portion, an intermediate waist portion and a lower base portion that are unitary with one another, said waist portion being narrower than said base portion.

15. The differential of claim 14, wherein said lower base portion of said ring gear is in direct driving contact with said side pinions.

16. A differential, comprising:
a one-piece ring gear having an internal surface and an external surface, said internal surface having spaced apart recesses, wherein at least one of said recesses has a side pinion seat surface bounded by two opposed side walls ;
a side pinion stub extending radially inward from said side pinion seat surface; and
at least one side pinion having a heel portion and a toe portion, wherein at least said heel portion is located in one of said recesses to receive said side pinion stub and said heel portion is in direct driving contact with said side walls of said recesses, a portion of an outer peripheral edge of the heel portion of each of the side pinions extends outwardly from the internal surface of the unitary ring gear.

17. The differential of claim 16, wherein said heel portion of said side pinion has a complimentary bore for receiving said side pinion stub therein.

18. The differential of claim 16, wherein said side pinion stub has an integrally formed base, said base having a complimentary shape to said recess to lock therein.

19. A ring gear system, comprising:
   an internal surface and an external surface defining a unitary toroidal shape, said external surface comprising a plurality of teeth, said internal surface itself entirely defining a plurality of circumferentially spaced apart side pinion recesses, each of said recesses having a side pinion seat surface bounded by two opposed side walls; and
   at least two side pinions each having a heel end and a toe end, wherein a portion of an outer peripheral edge of the heel portion of each of the side pinions extends outwardly from the internal surface of the unitary ring gear and at least said heel end is located in one of said recesses.

20. The ring gear system of claim 19, wherein said side pinions are solely supported and driven by said internal surface.

21. The ring gear system of claim 20, wherein said toe ends define a gap between one another.

22. The ring gear system of claim 21, wherein said toe ends of each side pinion are boreless.

23. The ring gear system of claim 22, wherein said side pinions each have a plurality of teeth located about an outer surface thereof, said plurality of teeth extending outwardly beyond a base portion of said ring gear for engagement with a plurality of teeth on adjacent side gears.

24. The ring gear system of claim 23, wherein each of said side pinions comprises a heel end lubricant cavity.

25. The ring gear system of claim 24, wherein said heel ends are substantially located within and entirely surrounded by said recesses of said ring gear.

26. The ring gear system of claim 25, wherein a side pinion stub extends radially inward from at least one pinion seat surface of said recess.

27. The ring gear system of claim 26, wherein a heel end of said side pinion has a complimentary bore for receiving said side pinion stub therein.

28. The ring gear system of claim 27, wherein said side pinion stub is connected to a base, said base having a complimentary shape to said recess to lock therein.

29. The ring gear system of claim 21, wherein said external surface is bolted to at least one differential case half.

* * * * *